United States Patent [19]

Darcy et al.

[11] Patent Number: 5,190,608
[45] Date of Patent: Mar. 2, 1993

[54] LAMINATED BELT

[75] Inventors: John J. Darcy, Webster; Karl V. Thomsen, Ontario; Eugene A. Swain, Webster, all of N.Y.

[73] Assignee: Xerox Corporation, Stamford, Conn.

[21] Appl. No.: 634,833

[22] Filed: Dec. 27, 1990

[51] Int. Cl.⁵ ............................................. B29C 65/08
[52] U.S. Cl. ................................ 156/73.4; 156/157; 156/233; 428/61
[58] Field of Search ............... 156/73.4, 233, 157; 428/57, 58, 61; 430/56, 58, 63, 127

[56] References Cited

U.S. PATENT DOCUMENTS

| | | | |
|---|---|---|---|
| 298,095 | 5/1884 | Kleinert | 428/61 |
| 2,993,823 | 7/1961 | Wilson | 428/61 |
| 3,121,006 | 2/1964 | Middleton et al. | 96/1 |
| 3,331,719 | 7/1967 | Soloff | 156/73.4 |
| 3,340,121 | 9/1967 | Lawrenz | 156/233 |
| 3,357,989 | 12/1967 | Byrne et al. | 260/314.5 |
| 3,442,781 | 5/1969 | Weinberger | 204/181 |
| 4,092,173 | 5/1978 | Novak et al. | 96/119 R |
| 4,200,676 | 4/1980 | Caponigro et al. | 428/57 |
| 4,233,384 | 11/1980 | Turner et al. | 430/59 |
| 4,265,990 | 5/1981 | Stolka et al. | 430/59 |
| 4,286,033 | 8/1981 | Neyhart et al. | 430/58 |
| 4,288,275 | 9/1981 | Davis | 156/233 |
| 4,291,110 | 9/1981 | Lee | 430/59 |
| 4,299,897 | 11/1981 | Stolka et al. | 430/59 |
| 4,306,008 | 12/1981 | Pai et al. | 430/59 |
| 4,333,998 | 6/1982 | Leszyk | 430/12 |
| 4,338,387 | 7/1982 | Hewitt | 430/58 |
| 4,362,799 | 12/1982 | Kondo et al. | 430/67 |
| 4,382,831 | 5/1983 | Clough et al. | 156/233 |
| 4,415,639 | 11/1983 | Horgan | 430/57 |
| 4,426,431 | 1/1984 | Harasta et al. | 430/14 |
| 4,439,507 | 3/1984 | Pan et al. | 430/59 |
| 4,461,662 | 7/1984 | Onishi | 156/73.4 |
| 4,472,491 | 9/1984 | Wiedemann | 430/58 |
| 4,477,548 | 10/1984 | Harasta et al. | 430/14 |
| 4,515,882 | 5/1985 | Mammino et al. | 430/58 |
| 4,532,166 | 7/1985 | Thomsen et al. | 428/57 |
| 4,724,026 | 2/1988 | Nelson | 156/233 |
| 4,758,486 | 7/1988 | Yamazaki et al. | 428/61 |
| 4,838,964 | 6/1989 | Thomsen et al. | 156/73.1 |
| 4,959,109 | 9/1990 | Swain et al. | 156/73.4 |

Primary Examiner—Michael W. Ball
Assistant Examiner—Steven D. Maki

[57] ABSTRACT

A flexible belt having an outwardly facing surface, a welded seam having irregular protrusion on the outwardly facing surface and a thin flexible strip laminated and covering the welded seam and protrusions. This belt may be fabricated by providing a flexible belt having an outwardly facing surface and a welded seam having irregular protrusion on the outwardly facing surface and laminating a thin flexible strip to the welded seam. This belt may be used in an electrostatographic imaging process.

5 Claims, 2 Drawing Sheets

LAMINATED BELT

BACKGROUND OF THE INVENTION

This invention relates in general to a laminated belt and more specifically to a belt having a laminated strip over a seam and processes for fabricating and using the laminated belt.

Various techniques have been devised for joining belts such as photoreceptor belts. Belts may be joined in manufacture by overlapping the edge of one end of a sheet over the other opposite edge of the sheet thus forming a lap joint or seamed region that is thereafter welded. The technique of joining thermoplastic belted materials is well known and illustrated, for example, in U.S. Pat. No. 4,838,964 and U.S. Pat. No. 4,959,109, both of these patents being incorporated by reference herein in their entirety.

Acceptable joints formed in the aforementioned joining process for belt shaped electrophotographic imaging members perform satisfactorily when transported around relatively large diameter rollers. The lap joints or seams of these belts contain a deposit of web material melted during joining. These deposits or "weld splashes" are formed on each side of the welded web adjacent to and adhering to each end of the original web and to the regions of the web underlying each splash. Unfortunately, when the belts are transported around very small diameter rollers having, for example a diameter of about 19 mm or less, the weld splash on the outer surface of the belt gradually separates from the upper end of the photoreceptor web during cycling to form an open crevasse or crack which is repeatedly struck by conventional cleaning blades during image cycling to cause the weld splash on the outer surface of the belt to also separate from the underlying web so that it is held to the belt at a small linear region located along the length of the splash on the side of the splash opposite the upper end of the photoreceptor web. This small linear region located along the length of the splash on the side of the splash opposite the upper end of the photoreceptor web functions as a hinge that allows the weld splash to pivot or flop away from the upper end of the photoreceptor web and from the underlying web so that carrier beads and toner particles or liquid ink developer collected in the space between the web and splash are periodically ejected when the splash flops open and closed when the seam passes the cleaning blade and also when it travels around small diameter rollers. The ejected materials float to various subassemblies (e.g. corotrons, lamps) and causes them to fail or perform poorly and ultimately cause copy defects. It is also believed that due to the roughness of the welded seam, the response time of the cleaning blade is not fast enough to conform to each hill and valley of the seam. This also provides an opportunity for the fibers to be trapped under the blade. Collisions of the blade with the flopping splash also result in the blade becoming chipped and pitted. These chips and pits in the blade leave streaks of toner or liquid ink on the photoreceptor surface which eventually appear as streaks on copies made during subsequent electrophotographic imaging cycles and adversely affect image quality.

In the non-welded regions of the photoreceptor, deposited electrostatic charges may be dissipated when exposed to an erase light. However, in welded regions of the photoreceptor, the continuity of the layers is disrupted by the welding process so that complete discharge of the welded region is not possible. Thus, when the charged portions of the welded seam pass through the development zone, toner is deposited and this deposited toner is at least partially removed during the cleaning operation. Unfortunately, the removed toner does not contribute to the forming of toner images on final copies and greatly increases the overall toner consumption of the imaging device. This problem is particularly acute in modular cartridge-type systems in which most of the functional components of a copier, including toner, are sealed in a disposable unit. Since these cartridge units are normally employed in very compact copiers with little spare space, units in a copier that consume unduly large amounts of toner are unacceptable because the toner housings must be too large to fit in a compact copier.

Thus, problems encountered with belt-type photoreceptors having a seam include repeated striking of the seam by cleaning blades. This causes toner developer or liquid ink agglomerates to form that are trapped at the irregular surface of the seam. Belted photoreceptors also tend to delaminate at the seam when the seam is subjected to constant battering by the cleaning blade. Plus, collisions between the cleaning blade and seam damage the blade thereby shortening blade and photoreceptor life and degrading copy quality. Also, toner consumption can be to great for some applications.

If a photoreceptor seam is coated with a solution of a resinous coating material dissolved in a suitable solvent and heated or placed in a vacuum to accelerate the removal of the solvent, the incipient photoreceptor seam coating can undergo substantial redistribution and deformation resulting, for example, in non-uniform defects such as creasing, wrinkling, cracking, blisters and the like due to solvent attack of components in the photoreceptor. Moreover, during the use of solution based coating techniques, the solvent can attack one or more layers of the photoreceptor belt and cause significant damage or complete destruction of the functional properties of the photoreceptor belt such as the flexibility, structural strength, or the imaging characteristics of the belt.

INFORMATION DISCLOSURE STATEMENT

In U.S. Pat. No. 4,472,491 to Wiedemann, issued Sep. 18, 1984—An ultraviolet radiation-cured protective layer comprising an acrylated binder is disclosed. The protective layer materials include an acrylated polyurethane, an acrylated polyester and an acrylated epoxide resin. Suitable curing is provided by radiation sources with electrical outputs of 100 W/cm (e.g. see column 4, lines 38–42).

In U.S. Pat. No. 4,092,173 to Novak et al, issued May 30, 1978, and U.S. Pat. No. 4,333,998 to Leszyk, issued Jun. 8, 1982—Radiation curable compositions comprising an acrylated urethane, an aliphatic ethylenically-unsaturated carboxylic acid and a multifunctional acrylate are disclosed. The composition in U.S. Pat. No. 4,333,998 additionally includes a siloxy-containing polycarbinol.

In U.S. Pat. No. 4,362,799 to Kondo et al, issued Dec. 7, 1982—An image holding member comprising a thermal or radiation curable epoxyacrylate resin insulating layer is disclosed. An object of the invention is to provide a surface that has good cleaning properties (e.g. see column 2, lines 57–62).

In U.S. Pat. No. 4,426,431 issued Jan. 17, 1984 and U.S. Pat. No. 4,477,548 issued Oct. 16, 1984 to Harasta et al—Radiation curable protective compositions are disclosed. In U.S. Pat. No. 4,426,431, the coating comprises polymerizable epoxy, acrylic and silane compounds. In U.S. Pat. No. 4,477,548, the coating composition includes a multifunctional acrylate of formula (III) (e.g. see column 12, lines 55–59).

While some of the above described members exhibit certain desirable properties such as providing restorative and/or protective treatment of surfaces, there continues to be a need for improved seamed belts, particularly in electrostatographic imaging systems utilizing blade cleaning. When ultrasonic welding techniques are utilized to fabricate belts having welded seams, particularly photoreceptors in electrostatographic copiers, duplicators, printers and the like that are transported over small diameter rollers, copy quality can deteriorate when blade cleaning is used during image cycling. Thus, there remains a need to provide electrophotographic imaging members having seam enhanced durability which allows for extended photoreceptor life. Also, a need exists for photoreceptor imaging members having improved copy quality and reliability. The application of a uniform coating over the entire surface of a photoreceptor web prior to cutting and welding does not improve the performance of a welded seam. The application of an overcoating over the entire outer surface of a flexible photoreceptor belt subsequent to cutting and welding is extremely difficult and time consuming because of the thickness tolerances required to ensure uniform electrical imaging properties.

SUMMARY OF THE INVENTION

It is an object of this invention to provide a laminated belt seam which overcomes the above-noted disadvantages.

It is another object of this invention to provide a laminated belt seam which avoids weld splash separation when cycled over small diameter rollers.

It is still another object of this invention to provide a laminated belt seam on photoreceptors which minimizes the formation of streaks on copies.

It is another object of this invention to provide a laminated belt seam which increases belt seam life.

It is still another object of this invention to provide a laminated belt seam which extends the useful life of belted photoreceptors.

It is yet another object of this invention to provide a laminated belt seam which provides for a smooth transition for a cleaning blade to follow while it moves over a photoreceptor seam and thereby increasing the useful life of cleaning blade members.

It is another object of this invention to provide a laminated belt seam for seamed photoreceptors which covers voids and non-uniformities in the seam so as not to trap liquid ink or dry toner and carry it into the next machine cycle.

It is still another object of this invention to provide a laminated belt seams for seamed photoreceptors which is an economical and practical method for conditioning seamed photoreceptors.

The foregoing objects and others are accomplished in accordance with this invention by providing a flexible belt having an outwardly facing surface, a welded seam having irregular protrusion on the outwardly facing surface and a thin flexible strip laminated and covering the welded seam and protrusions. This belt may be fabricated by providing a flexible belt having an outwardly facing surface and a welded seam having irregular protrusion on the outwardly facing surface and laminating a thin flexible strip to the welded seam. This belt may be used in an electrostatographic imaging process.

The advantages of the coated seam belts will become apparent upon consideration of the following disclosure of the invention, particularly when taken in conjunction with the accompanying drawings.

BRIEF DESCRIPTION OF THE DRAWINGS

A more complete understanding of the seam coating process and apparatus of the present invention can be obtained by reference to the accompanying drawings wherein.

These figures merely schematically illustrate the invention and are not intended to indicate relative size and dimensions of the belt, components thereof or means to fabricate the belt. For illustrative purposes, most of the following discussion is with specific reference to photoreceptors although the process of this invention is applicable to other types of seamed flexible belts.

Figure 1:
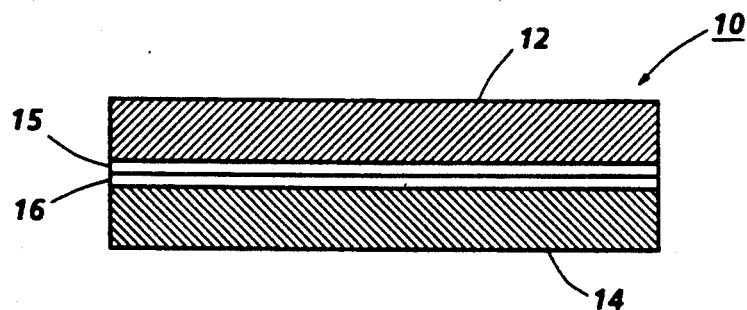
FIG. 1 is a schematic, sectional view in elevation of an assembly containing a strip to be affixed to a welded lap joint of a belt.

Referring to FIG. 1, a strip applicator assembly 10 to is shown comprising a flexible backing layer 12, an adhesive layer 14 and sandwiched therebetween, an optional adhesive layer 15 and a thin flexible strip 16. Flexible strip 16 is readily removable from either the optional adhesive layer, if such a layer is used, or from backing layer 12 if the optional adhesive layer is absent. The adhesive layer 14 is preferably a heat activatable adhesive.

Figure 2:
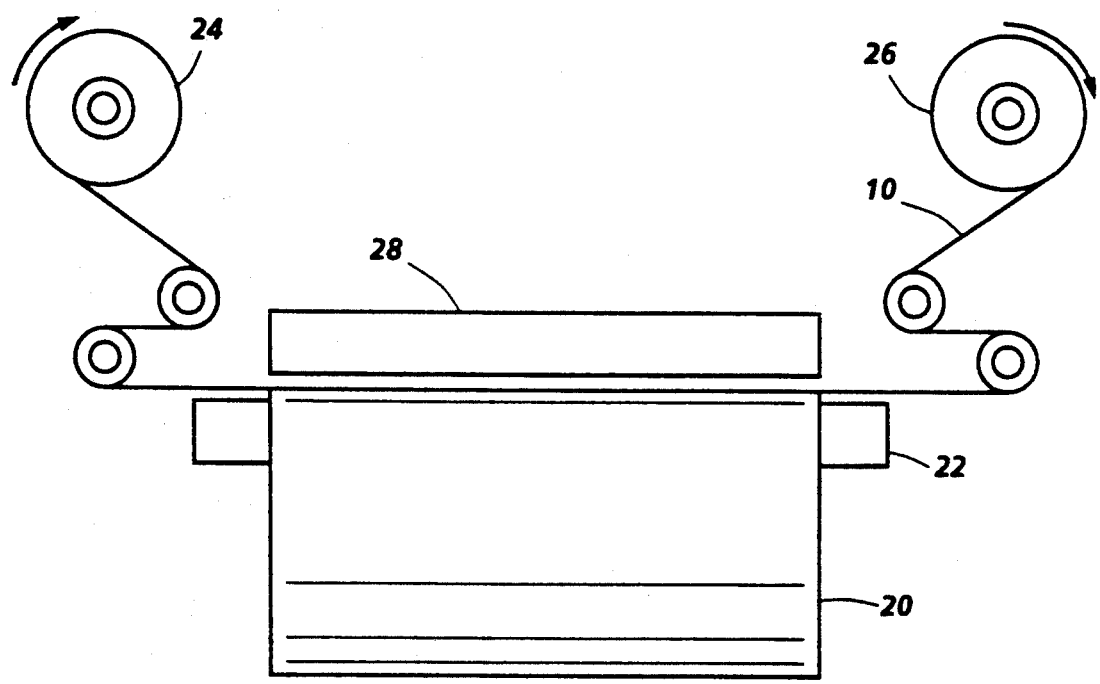
FIG. 2 is a schematic sectional view in elevation of a system for laminating a strip to belt seams.

Illustrated in FIG. 2 is a system for applying thin flexible strip 16 to the welded seam (not shown) of a photoreceptor belt 20 supported on an anvil 22. The strip applicator assembly 10 is conveyed over the welded seam of photoreceptor belt 20 by a take up roll 24 driven by a suitable means such as an electric motor (not shown) which pulls strip applicator assembly 10 from supply roll 26 around a series of guide rollers (similar to those used for guiding a typewriter ribbon) which position fresh sections of strip applicator assembly 10 over the welded seam of photoreceptor belt 20 with adhesive layer 14 facing the welded seam of photoreceptor belt 20. When a fresh section of strip applicator assembly 10 is in position over the welded seam of photoreceptor belt 20, a heated reciprocatable heat and pressure bar 28 positioned over strip applicator assembly 10 over the welded seam of photoreceptor belt 20 is lowered by any suitable means such as a solenoid (not shown) to press strip applicator assembly 10 and the welded seam against anvil 22. The reciprocatable heat and pressure bar 28 may be heated by any suitable means such as a conventional resistance heating element (not shown). The heat supplied by bar 28 melts adhesive layer 14. However, the heat supplied should not be so high as to cause flowing of the flexible backing layer 12 or seam covering flexible strip 16. Bar 28 is thereafter retracted and the adhesive layer is almost immediately hardened due to ambient room temperature cooling. The hardened adhesive layer 14 secures thin seam covering flexible strip 16 to the welded seam. Since the forces of adhesion between thin flexible strip 16 and seam are greater than between seam covering thin flexible strip 16 and flexible backing layer 12 or optional adhesive layer 15, the backing layer 12 is readily separated from flexible strip 16 when strip applicator assembly 10 is advanced by rotation of take up roll 24 to position a fresh section of strip applicator assembly 10 over the welded seam of a fresh belt for the next laminating operation. The use of flexible backing layer 12 facilitates the handling of fragile versions of very thin flexible strip 16 during the laminating process. Without such a flexible backing layer 12, fragile versions of very thin flexible strip 16 would require highly complex and sophisticated equipment to pick up the leading edge of flexible strip 16 and carry it across the width of the welded seam and subsequently lay it down on the seam without damaging flexible strip 16 during handling. The inherent forces exerted by a cleaning blade riding over the weld protected by flexible strip 16 are significantly less damaging than a cleaning blade riding over an unprotected seam.

Figure 3:
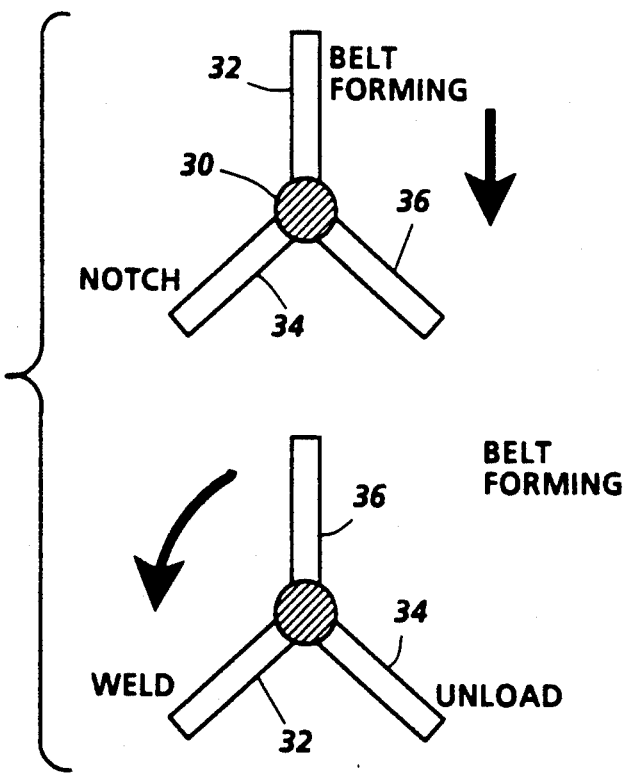
FIG. 3 is a schematic, plan view of a prior art system for fabricating photoreceptor belts with welded seams.

In FIG. 3, a prior art belt forming system is shown comprising a rotatable and reciprocatable shaft 30 supporting three cantilevered anvils 32, 34, and 36. In a first position shown in the upper figure of FIG. 3, anvil 32 is located in a belt forming station in which a belt (not shown) is positioned with overlapping ends resting on the upper surface of anvil 32. The ends are held in position by a vacuum applied through apertures (not shown) located in the upper surface of anvil 32 beneath the overlapping ends. The edge flashings of a previously welded belt (not shown) supported on anvil 34 are notched along the welded belt seam ends at a notch station at about the same time that the overlapping ends are positioned on the upper surface of anvil 32. After completion of the belt forming and notch operations, the shaft 30 and three cantilevered anvils 32, 34, and 36 are moved linearly to a second position shown in the lower figure of FIG. 3 and shaft 30 is rotated to move the belt on anvil 32 to a weld station, anvil 34 to a belt unload station, and empty anvil 36 to a ready position for subsequent insertion into the belt forming station. The welding station comprises an ultrasonic welding horn (not shown) which contacts and traverses the overlapping ends of the belt resting on the upper surface of anvil 32 to form the welded seam. Traversal may be accomplished by any suitable means (not shown) such as a lead screw and ball arrangement, belt and pulley drive, or the like. This prior art system, including the welding station, is described in detail in U.S. Pat. No. 4,838,964, the entire disclosure thereof being incorporated herein by reference.

Figure 4:
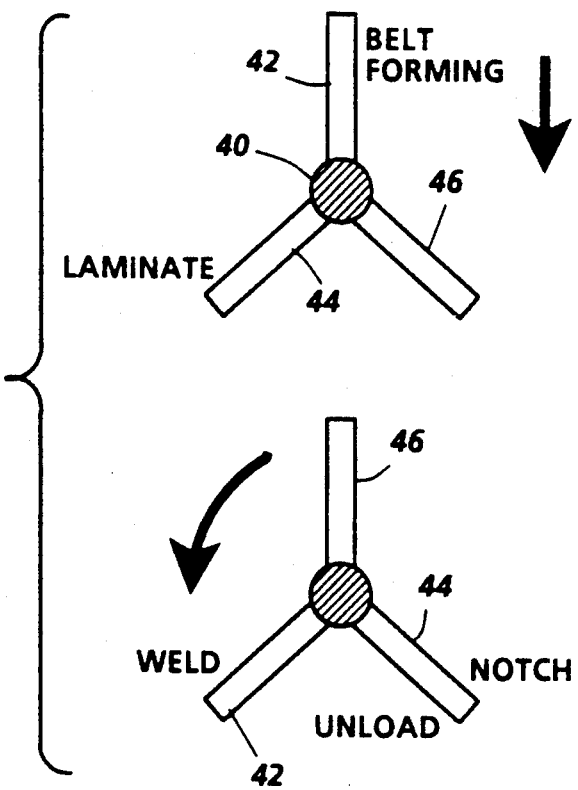
FIG. 4 is a schematic, plan view of a system of this invention for fabricating photoreceptor belts with welded seams.

Referring to FIG. 4, a modified belt forming system is shown in which the laminating system of this invention may be employed. The modified belt forming system comprises a rotatable and reciprocatable shaft 40 supporting three cantilevered anvils 42, 44, and 46. In a first position shown in the upper figure of FIG. 4, anvil 42 is located in a belt forming station in which a belt (not shown) is positioned with overlapping ends resting on the upper surface of anvil 42. The ends are held in position by a vacuum applied through apertures (not shown) located in the upper surface of anvil 42 beneath the overlapping ends. A thin seam covering strip (not shown) is laminated to the welded seam of a previously welded belt (not shown) supported on anvil 44 at a laminate station at about the same time that the overlapping ends are positioned on the upper surface of anvil 42. Lamination of the thin seam covering strip to the welded seam of the previously welded belt supported on anvil 44 may be effected by the system shown in FIG. 2. Thus, heated reciprocatable heat and pressure bar 28 (see FIG. 2) positioned over strip applicator assembly 10 over the welded seam of the photoreceptor belt on anvil 44 (see FIG. 4) is lowered by a suitable means such as a solenoid (not shown) to press strip applicator assembly 10 and the welded seam against anvil 44. The heat supplied by bar 28 melts adhesive layer 14. Bar 28 is thereafter retracted and the adhesive layer 14 is almost immediately hardened due to ambient room temperature cooling. The hardened adhesive layer 14 secures thin flexible strip 16 to the welded seam. Since the forces of adhesion between thin flexible strip 16 and seam are greater than between thin flexible strip 16 and flexible backing layer 12, the backing layer 12 is readily separated from strip 16 when strip applicator assembly 10 is advanced by rotation of take up roll 24 to position a fresh section of strip applicator assembly 10 over the welded seam of a fresh belt for the next laminating operation. After completion of the belt forming and laminate operations, the shaft 40 and three cantilevered anvils 42, 44, and 46 are moved linearly to a second position and shaft 40 is rotated to move the belt on anvil 42 to a weld station, anvil 44 to a combined belt notch and unload station, and empty anvil 46 to a ready position for subsequent insertion into the belt forming station. These steps can be readily implemented in view of the above teachings by a slight modification of the belt fabricating system described in detail in U.S. Pat. No. 4,838,964.

In an alternative embodiment, the system described with reference to FIG. 3 is modified slightly so that strip applicator assembly 10 (see FIG. 2) is conveyed over the overlapping ends of the belt resting on the upper surface of anvil 32 (see FIG. 3) by take up roll 24 which pulls strip applicator assembly 10 from supply roll 26 around a series of guide rollers which position fresh sections of strip applicator assembly 10 over the overlapping ends of the belt with adhesive layer 14 facing the belt 20. When a fresh section of strip applicator assembly 10 is in position over the overlapping ends of the belt, the ultrasonic welding horn (not shown) is brought into contact with and made to traverse the upper surface of the overlapping ends of the belt resting on the upper surface of anvil 32 to simultaneously activate the heat activatable adhesive layer 14 and weld overlapping ends of the belt. Upon removal of the horn and strip applicator assembly 10, thin flexible strip 16 adheres to the welded regions of the overlapping ends of the belt. Thus, the welding operation simultaneously welds a belt seam and laminates the thin flexible strip 16 to the welded belt seam.

Thus, this invention involves a laminating technique that covers the irregularities and defects of a flexible belt seam with a thin flexible strip thereby providing a uniformly smooth seam region which is durable, does not trap debris such as paper fibers or developer materials, or cause damage to contacting objects such as a cleaning blade.

The thin flexible strip laminated to the welded belt seam may comprise any suitable thin flexible strip material that can withstand abrasive contact with a flexible cleaning blade. The thin flexible strip material should also be continuous, film forming, resilient, stable, nonreactive, non-tacky, and resistant to cracking. The thin flexible strip material may be organic or inorganic. Typical organic materials include polymer films. Typical polymers include polyethylene terephthalate, polyester, polycarbonate, and the like. Typical inorganic materials include metals and metal alloys such as copper, gold, silver, aluminum titanium, zirconium, brass, stainless steel, niobium, tantalum, vanadium, hafnium, chromium, tungsten, molybdenum, and the like. The thin flexible strip laminated to the welded belt seam may be of any suitable thickness. Generally, the thickness is kept as thin as practical to minimize interference with the cleaning blade as it slides from the photoreceptor belt surface onto the outer surface of the thin flexible strip covering the welded belt seam. Preferably, the thin flexible strip covering the welded belt seam is in the form of a thin metal foil that was vacuum deposited onto a flexible backing layer prior to lamination to the belt seam. Generally, the vacuum deposited thin flexible strip material has a thickness between about 15 angstroms and about 15 micrometers. If desired, the metal flexible strip may be a preformed foil which is laminated to a flexible backing layer. Satisfactory results may be achieved with thin preformed flexible strips having a thickness of between about 10 micrometers and about 30 micrometers. Preferably, the thicknesses of thin preformed flexible strips is between about 15 micrometers and about 25 micrometers. When the thickness is less than about 15 angstroms, the metalized layer does not readily release as a whole integral layer from the backing layer. When the thickness is greater than about 30 micrometers, the total thickness of the laminated strip becomes excessive, and the doctor blade has difficulty riding up and over the laminated strip and adhesive layers. The thin flexible strip may be electrically insulating or electrically conductive. Alternatively, the thin flexible strip seam coating composition may be electrically insulating.

Since a welded seam does not normally discharge completely during image cycling, a thin flexible strip that is electrically conductive minimizes the buildup of dry toner or liquid developer material deposits on the seam region which wastes toner and which can be a source of contamination for other machine components and subsystems such as optical lenses and corona wires. Electrically conductive thin flexible strips are metallic or contain a conductive additive such as graphite, finely divided metal particles such as copper, silver, gold, iron, brass, stainless steel, niobium, tantalum, vanadium, hafnium, chromium, tungsten, molybdenum and the like. Where the electrically conductive thin flexible strip comprises a film forming polymer, the amount of conductive additive is preferably less than about 10 percent based on the total weight of the thin flexible strip including the conductive additive to ensure physical integrity during cycling with cleaning blades.

If desired, minor amounts of any suitable additive such plasticizers, colorants, wetting agents, fillers, and the like, may be added to thin flexible strips comprising a film forming polymer. Generally, the amount of filler is less than about 20 percent, based on the total weight of the thin flexible strip. Generally, the size of the additive particle should be less than the thickness of the thin flexible strip. The thin flexible strip may contain other additives, such as adhesion promoters. When these adhesion promoting additives are employed, they may be present in an amount less than about 15 percent by weight, based on the total weight of the thin flexible strip. The relative amount of the other additives is usually less than about 5 percent based on the total weight of the thin flexible strip. Generally, the particle size of additives should be less than about the thickness of the thin flexible strip.

Any suitable adhesive may be utilized to laminate the thin flexible strip to the welded belt seam. Preferably, the adhesive does not dissolve or otherwise cause permanent distortion of at least the components in the outer surface of the belt. Solubility in adhesives can cause undesirable deformation, blistering and the like of the photoreceptor surfaces. Also, the adhesive should be free of any other components which adversely cause permanent distortion of the underlying belt. However, temporary swelling of the outer surface by the adhesive is acceptable, particularly where such swelling promotes an interpenetrating network to be formed between adhesive coating molecules and the polymer molecules in the outer surface of the photoreceptor. The adhesive may be an active adhesive, a heat activatable adhesive, a pressure activatable adhesive, and the like. Typical adhesives include rubber, acrylic, high tack high shear adhesives, hot melt adhesives such as ethylene-vinyl acetate copolymers (e.g., Elvax, available from E.I. duPont Nemours and Company), polyamides, and polyesters, and the like. As with the thin flexible strip covering the welded belt seam, the thickness of the adhesive layer is preferably kept as thin as practical to minimize interference with the cleaning blade as it slides from the photoreceptor belt surface onto the outer surface of the thin flexible strip covering the welded belt seam. The adhesive layer may be of any suitable thickness. Satisfactory results may be achieved with adhesive layers having a thicknesses of between about 5 angstroms and about 70 micrometers. Preferably, the thicknesses is between about 10 micrometers and about 50 micrometers. When the thickness is less than about 5 angstroms, the adhesion may not be sufficient to prevent the laminate from delaminating. When the combined thickness of the adhesive layer and the strip is greater than about 100 micrometers, t can encounter difficulties riding up and over the laminated strip and adhesive layers without causing stubbing. Stubbing can cause excessive vibrations and upset the belt flatness. Since tacky adhesives often involve the use of a protective tape covering the exposed tacky surface to facilitate handling, they are less desirable than adhesives that are normally non tacky at ambient temperatures. If used, the protective tape is usually removed immediately prior to application of the thin flexible strip to the belt seam. The protective tape should adhere to the tacky adhesive with less force than the force between the tacky adhesive and the thin flexible strip. A preferred adhesive is a hot melt adhesive. Hot melt adhesives are activated by applying thermal energy. Hot melt adhesives are well known in the art and include, for example, and the like. The adhesive layer may be applied to the thin flexible strip by any suitable technique. Typical application techniques include spraying, brushing, extruding, wire wound rod coating, laminating, and the like. The adhesive may be electrically conductive. The adhesive may be rendered electrically conductive by the addition of electrically conductive particles. Typical electrically conductive particles include graphite, silver, gold, and the like. Generally, these particles should be in contact with each other to achieve optimum electrical conductivity. Generally, the amount of conductive additive is less than about 10 percent based on the total weight of the final adhesive layer including the conductive additive to ensure physical integrity during cycling with cleaning blades. Electrically conductive adhesives are preferred for securing an electrically conductive thin flexible strip to both the welded portion of the belt seam and to an electrically conductive ground strip which commonly runs along one edge of photoreceptor belts. The welded region can then be rendered electrically conductive by the same means that grounds the ground strip. Alternatively, one or more electrical contacts such as electrically conductive carbon brushes may be arranged around the periphery of the photoreceptor belt so that the laminated electrical conductive thin flexible strip may be periodically contacted with the contacts to electrically ground to allow any deposited electrostatic charges to leak off and prevent electrostatic deposition of toner particles thereon. In this latter embodiment, an electrically insulating adhesive layer may be employed.

To facilitate lamination of very thin flexible strips a flexible backing layer is preferably utilized for temporary support during lamination of the thin flexible strip to the seam. Any suitable flexible backing layer material may be utilized. For example, a flexible backing layer in the shape of a support tape may comprise any suitable thermoplastic film forming polymer. Typical film forming polymers include polyethylene terephthalate, polyester, polycarbonate, and the like. The assembly of the thin flexible strip temporarily secured to the flexible backing layer may be fabricated by any suitable technique. Thus, for example, the thin flexible strip may be preformed and then temporarily laminated to the flexible backing layer, or the thin flexible strip may be coated onto the flexible backing layer, or the flexible backing layer may be coated onto the thin flexible strip, or the like. Preferably, the assembly of the thin flexible strip temporarily secured to the flexible backing layer is fabricated by vacuum depositing the thin flexible strip as a thin layer of metal onto the flexible backing layer using any suitable conventional vacuum deposition process. The use of a vacuum deposition process facilitates the formation of ultra thin flexible strip metal foils. Typical metals that may be vacuum deposited have been described above. The vacuum deposited flexible strip metal foils are extremely thin and the edges thereof constitutes minimum interference to cleaning blades as the blades pass over the welded seam. Generally, the vacuum deposited flexible strip metal foils adhere to flexible backing layers with sufficient adhesion to allow normal handling of the assembly of the thin flexible strip and the flexible backing layer such as rolling and unrolling. Because of the greater adhesive strength of the adhesive layer applied to the side of the flexible strip facing away from the flexible backing layer, the flexible backing layer may be readily peeled away from the flexible strip after the flexible strip has been laminated to the belt seam.

If desired, an optional adhesive layer may be employed between the flexible backing layer and the thin flexible strip. This optional adhesive layer should adhere more weakly to the thin flexible strip than the permanent adhesive layer on the opposite side of the thin flexible strip. Also, it is preferred that the adhesion between the optional adhesive layer and the thin flexible strip also be weaker than the adhesion between the optional adhesive layer and the flexible backing layer so that when the flexible backing layer is peeled away from the flexible strip after the flexible strip has been laminated to the belt seam, the optional adhesive layer preferentially remains with the flexible backing layer rather than with the thin flexible strip. Any suitable adhesive material may be used in the optional adhesive layer. The adhesive layer may be applied to either the flexible backing layer or the thin flexible strip by any suitable technique. Typical application techniques include spraying, brushing, extruding, wire wound rod coating, and the like.

Any suitable thin, flexible web comprising a weldable thermoplastic metallic or thermoplastic polymer layer may be used for the welded belt. The web may comprise a single layer or a plurality of layers in which at least one of the layers comprises thermoplastic material. Any suitable thermoplastic material which will melt at the temperatures generated at the contiguous overlapping web surfaces of the seam may be utilized. Typical flexible metallic layers include nickel, aluminum, zirconium, titanium, and the like. Typical thermoplastic, polymeric materials include polyethylenes, polypropylenes, polycarbonates, polyvinylacetate, terephthalic acid resins, polyvinylchloride, styrene-butadiene copolymers and the like.

A preferred seamed belt is a flexible electrostatographic belt imaging member. Flexible belt imaging members are well known in the art. Typical electrostatographic flexible belt imaging members include, for example, photoreceptors for electrophotographic imaging systems and electroceptors or ionographic members for electrographic imaging systems.

Electrostatographic flexible belt imaging members may be prepared by any suitable technique. Typically, a flexible substrate is provided having an electrically conductive surface. For electrophotographic imaging members, at least one photoconductive layer is then applied to the electrically conductive surface. A charge blocking layer may be applied to the electrically conductive layer prior to the application of the photoconductive layer. If desired, an adhesive layer may be utilized between the charge blocking layer and the photoconductive layer. For multilayered photoreceptors, a charge generation binder layer is usually applied onto the blocking layer and a charge transport layer is formed on the charge generation layer. For ionographic imaging members, an electrically insulating dielectric layer is applied to the electrically conductive surface.

The substrate may be opaque or substantially transparent and may comprise numerous suitable materials having the required mechanical properties. Accordingly, the substrate may comprise a layer of an electrically non-conductive or conductive material such as an inorganic or an organic composition. As electrically non-conducting materials there may be employed various resins known for this purpose including polyesters, polycarbonates, polyamides, polyurethanes, and the like which are flexible as thin webs. The electrically insulating or conductive substrate should be flexible and in the form of an endless flexible belt.

The thickness of the substrate layer depends on numerous factors, including beam strength and economical considerations, and thus this layer for a flexible belt may be of substantial thickness, for example, about 125 micrometers, or of minimum thickness less than 50 micrometers, provided there are no adverse effects on the final electrostatographic device. In one flexible belt embodiment, the thickness of this layer ranges from about 65 micrometers to about 150 micrometers, and preferably from about 75 micrometers to about 100 micrometers for optimum flexiblity and minimum stretch when cycled around small diameter rollers, e.g. 19 millimeter diameter rollers.

The conductive layer may vary in thickness over substantially wide ranges depending on the optical transparency and degree of flexibility desired for the electrostatographic member. Accordingly, for a flexible photoresponsive imaging device, the thickness of the conductive layer may be between about 20 angstrom units to about 750 angstrom units, and more preferably from about 100 Angstrom units to about 200 angstrom units for an optimum combination of electrical conductivity, flexibility and light transmission. The flexible conductive layer may be an electrically conductive metal layer formed, for example, on the substrate by any suitable coating technique, such as a vacuum depositing technique. Typical metals include aluminum, zirconium, niobium, tantalum, vanadium and hafnium, titanium, nickel, stainless steel, chromium, tungsten, molybdenum, and the like. The conductive layer need not be limited to metals. Other examples of conductive layers include combinations of materials such as conductive indium tin oxide conductive carbon black dispersed in a plastic binder.

After formation of an electrically conductive surface, a hole blocking layer may be applied thereto. Any suitable blocking layer capable of forming an electronic barrier to charges such as holes between the adjacent photoconductive layer and the underlying conductive layer may be utilized. The blocking layer may be nitrogen containing siloxanes or nitrogen containing titanium compounds such as trimethoxysilyl propylene diamine, hydrolyzed trimethoxysilyl propyl ethylene diamine, N-beta(aminoethyl) gamma-amino-propyl trimethoxy silane, isopropyl 4-aminobenzene sulfonyl, di(dodecylbenzene sulfonyl) titanate, isopropyl di(4-aminobenzoyl)isostearoyl titanate, isopropyl tri(N-ethylamino-ethylamino)titanate, isopropyl trianthranil titanate, isopropyl tri(N,N-dimethyl-ethylamino)titanate, titanium-4-amino benzene sulfonat oxyacetate, titanium 4-aminobenzoate isostearate oxyacetate, [$H_2N(CH_2)_4$]$CH_3Si(OCH_3)_2$, (gamma-aminobutyl) methyl diethoxysilane, and [$H_2N(CH_2)_3$]$CH_3Si(OCH_3)$ (gamma-aminopropyl) methyl diethoxysilane, as disclosed in U.S. Pat. Nos. 4,291,110, 4,338,387, 4,286,033 and 4,291,110. The disclosures of U.S. Pat. Nos. 4,338,387, 4,286,033 and 4,291,110 are incorporated herein in their entirety. The blocking layer should be continuous and have a thickness of less than about 0.2 micrometer because greater thicknesses may lead to undesirably high residual voltage.

An optional adhesive layer may applied to the hole blocking layer. Any suitable adhesive layer well known in the art may be utilized. Typical adhesive layer materials include, for example, polyesters, polyurethanes, and the like. Satisfactory results may be achieved with adhesive layer thickness between about 0.05 micrometer and about 0.3 micrometer.

Any suitable photogenerating layer may be applied to the adhesive blocking layer which can then be overcoated with a contiguous hole transport layer as described hereinafter. Examples of typical photogenerating layers include inorganic photoconductive particles such as amorphous selenium, trigonal selenium, and selenium alloys selected from the group consisting of selenium-tellurium, selenium-tellurium-arsenic, selenium arsenide and mixtures thereof, and organic photoconductive particles including various phthalocyanine pigments such as the X-form of metal free phthalocyanine described in U.S. Pat. No. 3,357,989, metal phthalocyanines such as vanadyl phthalocyanine and copper phthalocyanine, dibromoanthanthrone, squarylium, quinacridones available from DuPont under the tradename Monastral Red, Monastral violet and Monastral Red Y, Vat orange 1 and Vat orange 3 trade names for dibromo anthanthrone pigments, benzimidazole perylene, substituted 2,4-diamino-triazines disclosed in U.S. Pat. No. 3,442,781, polynuclear aromatic quinones available from Allied Chemical Corporation under the tradename Indofast Double Scarlet, Indofast Violet Lake B, Indofast Brilliant Scarlet and Indofast Orange, and the like dispersed in a film forming polymeric binder. Multi-photogenerating layer compositions may be utilized where a photoconductive layer enhances or reduces the properties of the h photogenerating layer. Examples of this type of configuration are described in U.S. Pat. No. 4,415,639, the entire disclosure of this patent being incorporated herein by reference. Other suitable photogenerating materials known in the art may also be utilized, if desired. Charge generating binder layers comprising particles or layers comprising a photoconductive material such as vanadyl phthalocyanine, metal free phthalocyanine, benzimidazole perylene, amorphous selenium, trigonal selenium, selenium alloys such as selenium-tellurium, selenium-tellurium-arsenic, selenium arsenide, and the like and mixtures thereof are especially preferred because of their sensitivity to white light. Vanadyl phthalocyanine, metal free phthalocyanine and tellurium alloys are also preferred because these materials provide the additional benefit of being sensitive to infra-red light.

Any suitable polymeric film forming binder material may be employed as the matrix in the photogenerating binder layer. Typical polymeric film forming materials include those described, for example, in U.S. Pat. No. 3,121,006, the entire disclosure of which is incorporated herein by reference. Thus, typical organic polymeric film forming binders include thermoplastic and thermosetting resins such as polycarbonates, polyesters, polyamides, polyurethanes, polystyrenes, polyarylethers, polyarylsulfones, polybutadienes, polysulfones, polyethersulfones, polyethylenes, polypropylenes, polyimides, polymethylpentenes, polyphenylene sulfides, polyvinyl acetate, polysiloxanes, polyacrylates, polyvinyl acetals, polyamides, polyimides, amino resins, phenylene oxide resins, terephthalic acid resins, phenoxy resins, epoxy resins, phenolic resins, polystyrene and acrylonitrile copolymers, polyvinylchloride, vinylchloride and vinyl acetate copolymers, acrylate copolymers, alkyd resins, cellulosic film formers, poly(amideimide), styrene-butadiene copolymers, vinylidenechloride-vinylchloride copolymers, vinylacetate-vinylidenechloride copolymers, styrene-alkyd resins, polyvinylcarbazole, and the like. These polymers may be block, random or alternating copolymers.

The photogenerating composition or pigment is present in resinous binder compositions in various amounts, generally, however, from about 5 percent by volume to about 90 percent by volume of the photogenerating pigment is dispersed in about 10 percent by volume to about 95 percent by volume of the resinous binder, and preferably from about 20 percent by volume to about 30 percent by volume of the photogenerating pigment is dispersed in about 70 percent by volume to about 80 percent by volume of the resinous binder composition. In one embodiment about 8 percent by volume of the photogenerating pigment is dispersed in about 92 percent by volume of the resinous binder composition.

The photogenerating layer containing photoconductive compositions and/or pigments and the resinous binder material generally ranges in thickness of from about 0.1 micrometer to about 5.0 micrometers, and preferably has a thickness of from about 0.3 micrometer to about 3 micrometers. The photogenerating layer thickness is related to binder content. Higher binder content compositions generally require thicker layers for photogeneration. Thickness outside these ranges can be selected providing the objectives of the present invention are achieved.

The active charge transport layer may comprise an activating compound useful as an additive dispersed in electrically inactive polymeric materials making these materials electrically active. These compounds may be added to polymeric materials which are incapable of supporting the injection of photogenerated holes from the generation material and incapable of allowing the transport of these holes therethrough. This will convert the electrically inactive polymeric material to a material capable of supporting the injection of photogenerated holes from the generation material and capable of allowing the transport of these holes through the active layer in order to discharge the surface charge on the active layer. An especially preferred transport layer employed in one of the two electrically operative layers in a multilayered photoconductor comprises from about 25 percent to about 75 percent by weight of at least one charge transporting aromatic amine compound, and about 75 percent to about 25 percent by weight of a polymeric film forming resin in which the aromatic amine is soluble.

The charge transport layer forming mixture preferably comprises a charge transporting aromatic amine compound capable of supporting the injection of photogenerated holes of a charge generating layer and transporting the holes through the charge transport layer such as triphenylmethane, bis(4-diethylamine-2-methylphenyl)phenylmethane; 4'-4''-bis(diethylamino)-2',2''-dimethyltriphenylmethane, N,N'-bis(alkylphenyl)-[1,1'-biphenyl]-4,4'-diamine wherein the alkyl is, for example, methyl, ethyl, propyl, n-butyl, etc., N,N'-diphenyl-N,N'-bis(chlorophenyl)-[1,1'-biphenyl]-4,4'-diamine, N,N'-diphenyl-N,N'-bis(3''-methylphenyl)-(1,1'-biphenyl)-4,4'-diamine, and the like dispersed in an inactive resin binder.

Any suitable inactive resin binder soluble in methylene chloride or other suitable solvent may be employed in the process of this invention. Typical inactive resin binders soluble in methylene chloride include polycarbonate resin, polyester, polyarylate, polyacrylate, polyether, polysulfone, and the like. Generally, the thickness of the transport layer is between about 10 to about 50 micrometers, but thicknesses outside this range can also be used. The transport layer should be an insulator to the extent that the electrostatic charge placed on the hole transport layer is not conducted in the absence of illumination at a rate sufficient to prevent formation and retention of an electrostatic latent image thereon. In general, the ratio of the thickness of the hole transport layer to the charge generator layer is preferably maintained from about 2:1 to 200:1 and in some instances as great as 400:1.

Examples of photosensitive members having at least two electrically operative layers include the charge generator layer and diamine containing transport layer members disclosed in U.S. Pat. Nos. 4,265,990, 4,233,384, 4,306,008, 4,299,897 and 4,439,507. The disclosures of these patents are incorporated herein in their entirety. The photoreceptors may comprise, for example, a charge generator layer sandwiched between a conductive surface and a charge transport layer as described above or a charge transport layer sandwiched between a conductive surface and a charge generator layer.

Other layers may be utilized such as conventional electrically conductive ground strip along one edge of the belt in contact with the conductive layer, blocking layer, adhesive layer or charge generating layer to facilitate connection of the electrically conductive layer of the photoreceptor to ground or to an electrical bias. Ground strips are well known in the art and usually comprise a strip along one edge of a photoreceptor belt, the strip comprising conductive particles such as graphite dispersed in a film forming binder.

Optionally, an overcoat layer may also be utilized to improve resistance to abrasion. In some cases an anti-curl back coating may be applied to the side opposite the photoreceptor to provide flatness and/or abrasion resistance. These overcoating and anti-curl back coating layers are well known in the art and may comprise thermoplastic organic polymers or inorganic polymers that are electrically insulating or slightly semi-conductive. They are also continuous and generally have a thickness of less than about 10 micrometers. A typical overcoating is described in U.S. Pat. No. 4,515,882, the entire disclosure of which is incorporated herein by reference. The thickness of anti-curl backing layers should be sufficient to substantially balance the total forces of the layer or layers on the opposite side of the supporting substrate layer and typically is between about 70 and about 160 micrometers.

For electrographic imaging members, a flexible dielectric layer overlying the conductive layer may be substituted for the photoconductive layers. Any suitable, conventional, flexible, electrically insulating dielectric polymer may be used in the dielectric layer of the electrographic imaging member. If desired, the flexible belts of this invention may be used for other purposes where cycling durability is important.

Generally, electrostatographic imaging members are fabricated from webs by cutting the webs into rectangular sheets, overlapping a small segment of opposite edges of each sheet to form a loop and securing the overlapping edges of the sheet together to form a narrow seam. The overlapped edges of the sheet may be secured to each other by any suitable technique such as ultrasonic welding and the like. Any suitable seam overlap may be utilized. A preferred range of overlap is between about 0.9 millimeter and about 1.4 millimeters. The preparation of welded belts is well known and disclosed, for example, in U.S. Pat. Nos. 4,532,166 and 4,838,964. The disclosures of these patents are incorporated herein in their entirety.

The thin flexible strip may be laminated to the welded belt seam by any suitable technique. In one embodiment the seam is welded prior to application of the thin flexible strip. More specifically, a strip applicator assembly may be utilized to facilitate lamination of the thin flexible strip to the welded belt seam as illustrated, for example, in FIG. 2. Thus, the strip applicator assembly comprising a flexible backing layer, thin flexible strip and hot melt adhesive layer is placed on the welded seam and the hot melt adhesive is activated by a suitable means such as a heat bar that is pressed down on the flexible backing layer which in turn presses the thin flexible strip and the hot melted adhesive against the weld while simultaneously melting the hot melt adhesive. The heat bar may be thereafter be removed to allow the melt adhesive to cool. Since the hot melt adhesive cools rapidly at ambient temperature and strongly binds the thin flexible strip to the welded seam, the flexible backing layer may thereafter be peeled away from the thin flexible strip and the thin flexible strip preferentially adheres to the welded seam. This lamination operation can occur at a lamination station as illustrated in FIG. 4.

In another embodiment, the thin flexible strip may be laminated to a belt seam at the same time that the belt seam is welded. When the thin flexible strip is applied simultaneously with welding, the strip applicator assembly comprising the flexible backing layer, thin flexible strip and hot melt adhesive layer are placed over the overlapped ends of the sheet that is being fabricated into a web. A welding horn is thereafter lowered against the stacked assembly of the flexible backing layer, thin flexible strip, hot melt adhesive layer and overlapping sheet ends. This can take place at the weld station shown, for example, in FIG. 3. Traversal of this stacked assembly by the ultrasonic welding horn heats the hot melted adhesive to activate it and also melts the adjacent surfaces of the overlapping sheet ends. Thus, upon completion of traversal by the welding horn, the overlapping ends are welded and the adhesive layer binds the thin flexible strip to the welded seam. Since the hot melt adhesive cools rapidly at ambient temperature and strongly binds the thin flexible strip to the welded seam, the flexible backing layer may thereafter be peeled away from the thin flexible strip and the thin flexible strip preferentially adheres to the welded seam. The original strip applicator assembly, including the thin flexible strip, prior to the lamination operation may be wider than the portion of the thin flexible strip that is actually laminated to the welded seam. In the embodiment where vacuum deposited metal is utilized in combination with simultaneous welding, portions of the adhesive layer that are not melted by the welding horn, tend to adhere (along with the overlying thin flexible strip material) to the flexible backing layer whereas portions of the adhesive that were melted by the welding horn will adhere (along with the overlying thin flexible strip material) to the welded seam. It is preferred that the width of the strip applicator assembly in excess of the width of the thin flexible strip material to actually be laminated, be kept to a minimum to reduce waste. Typical widths are between about 8 millimeters and about 12 millimeters because this width range normally fully bridges widths of typical welded belt seams.

In still another embodiment, the thin flexible strip may be manually or mechanically applied to the welded belt seam by taking a roll of thin flexible strip material coated with a tacky adhesive, not unlike a roll of ordinary adhesive tape, stripping off a length of the thin flexible strip material at least equal in length to a welded belt seam and pressing the adhesive side of the stripped length against the welded seam. This latter embodiment is less preferred because the thin flexible strip must normally be relatively thick in order to facilitate handling without a flexible backing layer. If a flexible backing layer is employed with the thin flexible strip, thinner flexible strips such as a vacuum deposited metal foil may be used if a protective release layer is temporarily placed against the tacky adhesive. A thin flexible strip having a tacky adhesive layer can be laminated by various techniques with a protective releasable tape covering the adhesive layer. One such technique employs a wide flexible strip that is much wider than the flexible strip to be laminated on the seam. This arrangement facilitates handling of the flexible strip by mechanical means. For example, a wide flexible strip may be pulled from a supply roll, slit along each edge so that the narrow strips (resembling a pair of parallel railroad tracks) formed along each edge can be taken up on a take up roll and the releasable tape taken up on another take up roll while the center portion comprising the flexible strip and adhesive layer is laminated to the seam. More specifically, the leading edge of the central portion is pressed against one end of the welded seam and the remaining portion of the tape, equal to the length of the seam, is thereafter pressed against the remaining portions of the seam followed by cutting of the trailing edge of the tape so that is aligns with the opposite end of the welded seam. The two outer strips are taken up by the take up roll to align the cut edge of the central portion with the far edge of the next seam to be laminated.

The distance of the final laminated thin flexible strip edge from the seam centerline may vary but should extend far enough from the seam centerline to cover the surface irregularities created during welding. The seam centerline is defined as the midpoint of the overlap interface of the web ends that were welded together. Final laminated thin flexible strip edge locations extending in a direction perpendicular to the seam centerline beyond the seam irregularities tend to reduce the total area of the outwardly facing belt surface available for imaging. However, where the weld irregularities are relatively high and narrow, wider final laminated thin flexible strips provide a more gradual ramp or slope for cleaning devices such as blades to slide over the seam. Generally, satisfactory results may be achieved with final laminated thin flexible strip widths in which the distance of the final laminated thin flexible strip edge from the seam centerline is between about 4 mm and about 10 mm. A feathered edge on each edge of the final laminated thin flexible strip may assist cleaning blades as they ride over the seam coating.

A number of examples are set forth hereinbelow and are illustrative of different compositions and conditions that can be utilized in practicing the invention. All proportions are by weight unless otherwise indicated. It will be apparent, however, that the invention can be practiced with many types of compositions and can have many different uses in accordance with the disclosure above and as pointed out hereinafter.

EXAMPLE I

A flexible photoreceptor belt was formed from web of polyester film (Mylar, available from E. I. duPont de Nemours and Co.) having a width of about 33.5 cm, a length of about 59 cm and a thickness of about 76 micrometers and having a first coating on one side of a polyester having a thickness of about 0.2 micrometer and a second coating comprising polyvinyl carbazole about 3 micrometers thick was coated on both sides with a layer comprising polycarbonate resin, each polycarbonate coating having a thickness of about 25 micrometers. The belt was formed by overlapping about 0.9 mm of the opposite ends of the belt to form a seam, placing the seam on an anvil, and welding the seam with a traversing ultrasonic welding horn. This belt was cycled in a xerographic imaging test device at an imaging surface speed of about 3 cm per second to make copies. The test device comprised a 3 roll belt support structure in which one roll had a diameter of 19 mm. A polyurethane doctor blade was used to clean the photoreceptor imaging surface. The uncoated welded seamed belt was periodically examined during cycling for any cracks, crevasses, flaps, scratches, nicks, dislocations and the like formed by separation of the weld splash material from the belt substrate. The uncoated seamed belt was considered unacceptable when separation of the outer splash material from the belt substrate exceeded a total distance of 35 mm in length. The seamed area was viewed with the aid of a microscope. Delamination changed the color of the splash material to lighter shade of brown which was discernible along the length of the welded seam as measured along the length of the welded seam. It was found that the average number of cycles to the point of unacceptable performance was about 10,000 cycles. Moreover, examination of the cleaning blade after 10,000 cycles showed no wear.

EXAMPLE II

A thin flexible strip of copper having a width of about 12 cm and a length of about 33.5 cm and a thickness of about 3 micrometers was vacuum deposited on a polyethylene terephthalate flexible backing layer sheet having a width of about 12 cm and a length of about 33.5 cm and a thickness of about 25 micrometers. The side of the thin flexible strip of copper facing away from the polyethylene terephthalate sheet was coated with a heat activatable adhesive layer. A seamed belt identical to the one described in Example I was placed on a supporting surface with the welded seam facing upwardly. The strip applicator assembly of flexible backing layer, thin flexible strip of copper and adhesive layer was placed on the belt with the thin flexible strip of copper centered over the welded seam and with the adhesive layer in contact with the seam. A resistance wire heat bar having a flat heating surface having a width of about 8 cm and a length of about 35.5 cm was heated to a temperature of about 120° C. and placed against the back surface of the flexible backing layer under a pressure of about 280 grams/cm$^2$ for about 4 seconds. The heat bar was thereafter removed and 2 seconds later, the flexible backing layer was peeled away from the belt. A layer of copper having a width of about 8 cm and a length of about 35.5 cm remained laminated to the welded seam. The distance of each edge of the laminated layer of the laminated copper layer from the centerline of the welded seam was about 4 mm. The laminated layer of copper formed a smooth and flexible surface over all of the protrusions in the welded seam.

EXAMPLE III

The coated seamed belt prepared by the seam laminating process described in Example II was rapidly cycled to make copies in the same manner as that described in Example I. The laminated seam of the belt was periodically examined during cycling for any cracks, crevasses, flaps, scratches, nicks, dislocations and the like formed by separation of the weld splash material from the belt substrate. The coated seamed belt was considered unacceptable when separation of the outer splash material from the belt substrate exceeded a total distance of 35 mm in length. The seamed area was viewed with the aid of a microscope. Delamination changed the color of the splash material to lighter shade of brown which was discernible along the length of the welded seam. It was found that the average number of cycles to the point of unacceptable performance was about 12,000 cycles. Thus the life of the coated seamed belts prepared by the process of this invention was almost 60 percent greater than that of the prior art control process described in Example I. Moreover, examination of the cleaning blade after 12,000 cycles showed no sign of wear. This represents a 60 percent improvement over the blade life of Example I.

An electrically conductive thin flexible sheet of polymer containing dispersed graphite particles was provided having a width of about 200 cm, a length of about 50 m and a thickness of about 25 micrometers (available from RPM Richards Parents and Murray Inc.). The thin flexible sheet was coated with an adhesive layer of having a thickness of 10 micrometers. The adhesive layer was applied to the thin flexible she by a gravure applicator. The thin flexible sheet was slit into strips having a width of about 10 cm and a length of about 33.5 cm. A seamed belt identical to the one described in Example I was placed on a supporting surface with the welded seam facing upwardly. One of the thin flexible strip was centered over the welded seam and with the adhesive layer in contact with the seam and thereafter pressed into place on the belt. The distance of each edge of the thin flexible strip laminated from the centerline of the welded seam was about 5 mm. The laminated thin flexible strip formed a smooth and flexible surface over all of the protrusions in the welded seam.

Although the invention has been described with reference to specific preferred embodiments, it is not intended to be limited thereto, rather those skilled in the art will recognize that variations and modifications may be made therein which are within the spirit of the invention and within the scope of the claims.

What is claimed is:

1. A process comprising providing a rectangular flexible sheet comprising thermoplastic substrate, a charge generating layer and a charge transport layer, said charge transport layer comprising a thermoplastic material, overlapping the opposite ends of said sheet to form a belt with said charge transport layer facing outwardly away from the center of said belt, the overlapped ends being between about 0.9 millimeter and about 1.4 millimeters from each other, ultrasonically welding said overlapped ends together to form a welded seam having irregular protrusions on the outwardly facing surface of said seam, laminating a thin flexible strip to said welded seam by providing a tape comprising a flexible backing, a thin flexible metal foil, a weakly adhering adhesive layer between said backing and said foil and an activatable adhesive layer on the side of said foil facing away from said backing, the distance from each edge of said flexible strip to a centerline between said overlapped ends being between about 4 mm and about 10 mm, applying said tape to said seam, activating said activatable adhesive layer and removing said backing whereby said foil permanently adheres to said seam and separates from said backing.

2. A process according to claim 1 wherein said flexible metal foil has a thickness between about 0.0015 micrometer and about 30 micrometers.

3. A process according to claim 1 wherein said activatable adhesive layer comprises a heat activatable adhesive.

4. A process according to claim 1 wherein said adhesive layer has a thickness of between about 0.0005 micrometer and about 70 micrometers.

5. A process according to claim 1 including forming an electrostatic latent image on said transport layer, developing said electrostatic latent image with toner particles to form a toner particle image, transferring said toner particle image to a receiving member, and contacting said transport layer with a cleaning blade to remove any residual toner particles.

* * * * *